Sept. 28, 1954  G. D. FORBES  2,690,510
BLOCKING OSCILLATOR CIRCUITS
Filed March 29, 1946
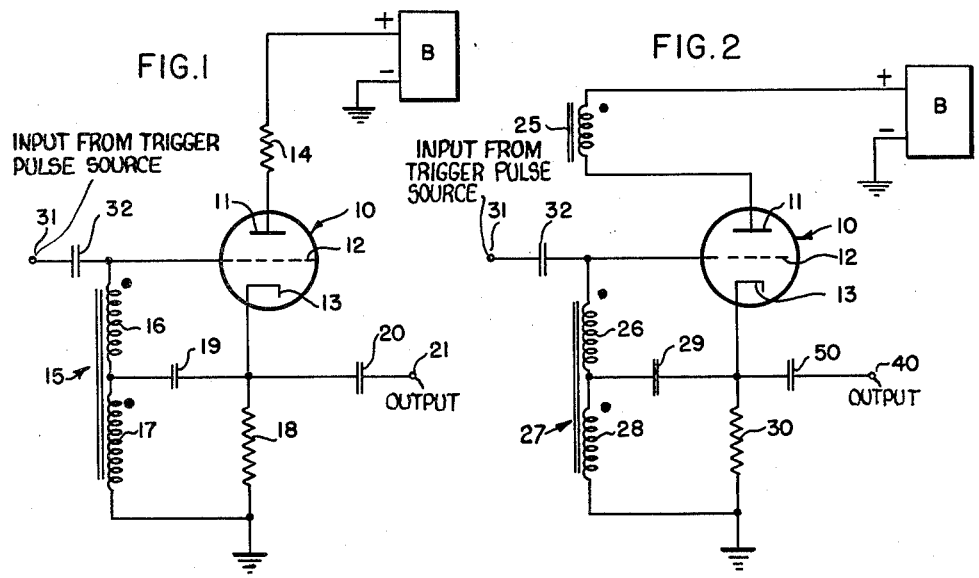
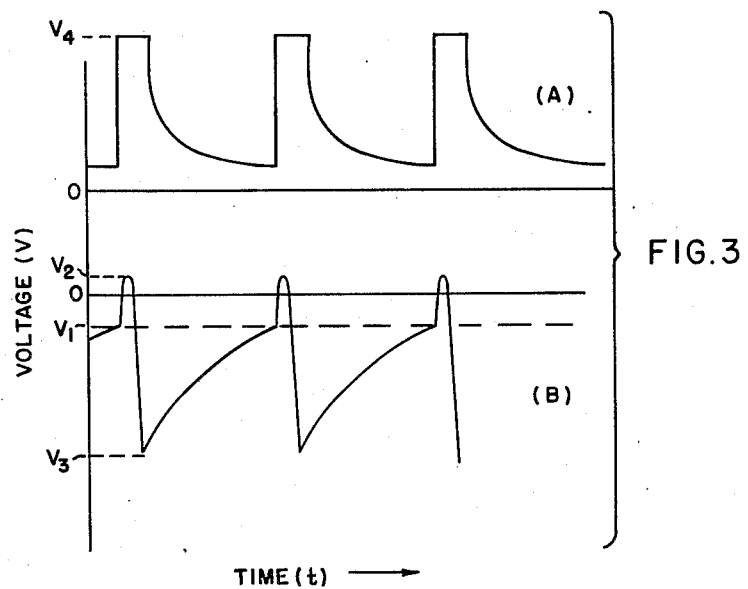
INVENTOR.
GORDON D. FORBES
BY
William D. Hall.
ATTORNEY Patented Sept. 28, 1954

2,690,510

UNITED STATES PATENT OFFICE 2,690,510

BLOCKING OSCILLATOR CIRCUITS

Gordon D. Forbes, Sudbury, Mass., assignor, by mesne assignments, to the United States of America as represented by the Secretary of War Application March 29, 1946, Serial No. 657,932

3 Claims. (Cl. 250—36)

This invention relates generally to an oscillator circuit, and, more particularly, to a blocking oscillator circuit.

An object of the present invention is to provide a blocking oscillator circuit adapted to produce in its output a series of pulses which occur simultaneously with a controlling input trigger series. It is a further object that the output pulses possess several characteristics such as steep edges, long duration, and high, flat top amplitudes.

It is another object that the blocking oscillator function with a series of trigger pulses having either a fixed or a variable pulse repetition frequency (p. r. f.). It is, therefore, another object that the circuit will recover immediately to a responsive condition upon the termination of a trigger pulse, so that the oscillator will function on a closely following trigger pulse.

Still another object is to provide a blocking oscillator circuit which is adapted to oscillate freely and produce in its output a continuous series of output pulses of the type described above.

Other objects, features and advantages of this invention will suggest themselves to those skilled in the art and will become apparent from the following description of the invention taken in connection with the accompanying drawings in which:

Fig. 1 is a schematic diagram of a first embodiment of a blocking oscillator circuit embodying the principles of this invention;

Fig. 2 is a schematic diagram of a second embodiment of a blocking oscillator circuit embodying the principles of this invention; and Fig. 3 shows voltage-time graphs illustrating the operational aspects of the embodiment shown in Fig. 1.

Referring to the schematic diagram of Fig. 1, there is shown a first embodiment of the invention in the form of a blocking oscillator circuit including vacuum tube 10, having an anode 11, control grid 12, and cathode 13. Anode 11 is connected through load resistor 14 to the positive terminal of a suitable source of potential, designated B. The negative terminal of voltage source B is grounded. Cathode 13 is returned through resistor 18 to ground potential. The embodiment shown includes a pulse transformer 15. The pulse transformer comprises two windings 16 and 17, which may be of the single winding, center-tapped transformer variety. The windings are closely coupled together and wound on an iron core. The dots indicate the relative polarity of the voltages induced in the transformer windings at the end adjacent to the dot. For example, the ends of the windings having dots are positive at the same time. One end of winding 16 is connected to control grid 12, and the other end is connected to winding 17, which is the center tap of the windings, and, also through blocking condenser 19, to cathode 13. The end of winding 17 remote from the center-tap is returned to ground potential. The windings are connected such that for an increase in voltage at the cathode, there will be a corresponding increase in voltage at the control grid.

The output is taken from cathode 13, and is applied through coupling capacitor 20 to output terminal 21. A series of input trigger pulses at input terminal 31 may be applied to grid 12 through coupling condenser 32.

To facilitate the explanation of the operation of the circuit shown in Fig. 1, the voltage-time graphs of Fig. 3 will be referred to. Fig. 3 includes two approximate voltage-time graphs, illustrating the voltage variation at two points of the circuit of Fig. 1. The graphs are plotted on the same time scale and reference axis, with different voltage scales for each graph being used. Graph A is the approximate representation of the output voltage pulses which appear at cathode 13. Graph B illustrates the approximate voltage variation between the control grid and cathode. voltage $V_1$, indicated in Fig. 3, represents the grid to cathode cut-off voltage of the tube. For any voltage between grid and cathode which is more negative than voltage $V_1$, tube 10 will be in a nonconducting state.

In the operation of the circuit of Fig. 1 as a free running blocking oscillator, cathode 13 is originally above cut-off potential, tube 10 is not conducting, and grid 13 is at ground potential due to the previous operation of the circuit. When the grid to cathode potential reaches cut-off value, voltage $V_1$ in Fig. 3, tube 10 immediately starts to conduct. The instantaneous increase in plate current causes the voltage of cathode 13 to go positive. Instantaneous plate current flows by way of two paths, through resistance 18, and through winding 17 in series with condenser 19. The increase in potential at cathode 13 is applied by means of transformer 15 to grid 12 as an increase in potential. As the grid is driven more and more positive, plate current continues to increase until the tube becomes saturated in the nonlinear region of the tube characteristics. This action is cumulative and rapid. At saturation, the potential on cathode 13 has a value such as voltage $V_4$, shown in Fig. 3. While saturated, the grid-cathode voltage becomes less and less effective as compared to the plate voltage, which is low, in controlling the current flow through the tube. A transition period occurs, conduction ceases, and the plate voltage is driven quickly back to its original value. This action is again cumulative and rapid.

During the transition period, the grid becomes positive with respect to the cathode, as shown by voltage $V_2$ in Fig. 3, and grid current begins to flow. The potential drop existing across condenser 19 at this time provides a driving potential for the flow of grid current. Grid current does not flow immediately due to the retarding effect of the windings 16 and 17 through which current must flow. The transition period is therefore extended as shown by curve A of Fig. 3.

At the end of the transition period, the flow of grid current has charged condenser 19 in the reverse polarity, producing a negative grid-to-cathode potential. The flow of plate current, therefore, begins to decrease, the voltage at cathode 13, and also at grid 12 decreases. The action is again cumulative and rapid, until the potential at the grid is driven to a low negative value, with respect to the cathode, such as voltage $V_3$ in Fig. 3. Plate current thereby ceases to flow.

The negative charge remaining on condenser 19 then decays exponentially to ground potential, through winding 17 and resistor 18, at a fixed rate determined primarily by the time constant of the network comprising capacitor 19 and resistor 18. When the potential between the grid and cathode reaches the cutoff value $V_1$, the tube immediately starts to conduct as has been described. A cycle of blocking oscillator action is thereby completed. The blocking oscillator derives its name from the above described chain of events, which is sometimes referred to collectively as a blocking action.

The output is taken from the blocking oscillator from cathode 13, and appears at output terminal 21. The variation of cathode voltage is shown by graph A of Fig. 3. The output voltage pulse is characterized by having steep leading edges, high amplitudes, and long duration.

As mentioned hereinbefore, condenser 19 discharges through resistance 18 and winding 17. The tube remains cut off for a relatively long period of time, as compared to the period during which the tube conducts a current. The recurrence frequency is, therefore, nearly equal to the inverse of the cut-off period. A variable resistance, not shown in the figure, may be substituted for resistor 18, and a recurrence frequency control means thereby provided.

The circuit embodying the principles of this invention and having the form shown in the first embodiment is particularly adapted to use a transformer with a single, center-tapped winding. Since the transformer windings are included on the grid-cathode circuit, the windings need not be insulated for high direct-current operating potentials. Such a transformer can be built and adapted to have a minimum leakage inductance and stray capacitances.

Referring to the schematic diagram of Fig. 2, there is shown a second embodiment of the invention including, in the form of a blocking oscillator circuit, a vacuum tube 10 having an anode 11, control grid 12, and cathode 13. Anode 11 is connected through winding 25 of three-winding pulse transformer 27 to the positive terminal of a suitable source of potential, designated B. Control grid 12 is connected to one end of winding 26 of pulse transformer 27. The other end of winding 26 is connected to a second winding 28 of the pulse transformer. The secondary of transformer 27 comprising windings 26 and 28 may be similar in construction to windings 16 and 17, respectively, of transformer 15 shown in Fig. 2. The junction of windings 26 and 28, therefore, form a center tap of the secondary winding of transformer 27, and is connected through capacitor 29 to cathode 13 of tube 10. Winding 25 in the anode circuit of the tube forms the primary winding of transformer 27. The three-windings are, therefore, mutually inductive. The dots associated with the transformer windings indicate the relative polarity of the voltage induced in the transformer windings as described in connection with the circuit of Fig. 1. The windings of the transformer are connected such that for a decrease in voltage on the plate of the tube, there will be a corresponding increase in voltage at the cathode and also at the control grid. The end of winding 28 remote from the center-tap is returned to ground potential. Cathode 13 is returned through resistor 30 to ground potential.

Output terminal 40 is connected to the cathode end of resistor 30 through capacitor 50. A series of input trigger pulses at input terminal 31 may be applied to grid 12 through coupling condenser 32.

The operation of the circuit in the embodiment shown in Fig. 2 is similar to that described for the embodiment shown in Fig. 1. Instead of a two-winding transformer, the circuit of Fig. 2 includes a three-winding pulse transformer which provides coupling between the three tube electrodes, anode, grid, and cathode. The introduction of the additional winding greatly accentuates the blocking action of the blocking oscillator. The circuit is adapted to provide extremely long, square pulses.

Either of the free running blocking oscillators described may be modified to operate in synchronism with a series of input trigger pulses. The positive input trigger pulses applied to input terminal 31 may be applied through coupling condenser 32 to the control grid of the tube. Negative input pulses may be applied to the cathode of the tube. If the input pulses have a fixed frequency, the free-running frequency of the blocking oscillator may be adjusted slightly less than the frequency of the input pulses. When operated in such a manner, the blocking oscillator will produce in its output a series of pulses which occur simultaneously with the controlling input trigger series. With suitable values of the circuit elements, the blocking oscillator will recover immediately after a first blocking action, to become responsive at the termination of a first trigger pulse to a closely following trigger pulse. The frequency of the series of input trigger pulses may vary slightly.

While there has been described hereinabove what is at present considered to be a preferred embodiment of this invention, it will be obvious to those skilled in the art that various changes and modifications may be made therein without departing from the true spirit and scope of the invention.

What is claimed is:

1. A vacuum tube circuit comprising a vacuum tube having at least a control grid, a cathode, and an anode, a multi-winding transformer for coupling said cathode and said control grid, a capacitor, one end of one winding of said transformer being connected to said control grid and the other end of said one winding being connected through said capacitor to said cathode, one end of a second winding of said transformer being connected to said other end of said one winding and the other end of the second winding being connected to ground potential, one end of a third winding of said transformer being connected to the positive terminal of a source of potential, said anode being connected to the other end of said third winding, all of said windings being inductively coupled to one another, and a resistive impedance connected between said cathode and ground potential.

2. A blocking oscillator, including a vacuum tube having at least a cathode, a control grid, and an anode, and circuits therefor, and multi-winding pulse transformer means for coupling the control grid and the cathode circuits of said tube in such phase that for every change in cathode potential there is a corresponding change of like polarity in control grid potential, said transformer means further coupling the control grid and anode circuits of said tube in such phase that for every change in anode potential there will be a corresponding change of opposite polarity in control grid potential.

3. The oscillator of claim 2, further including means for applying trigger pulses to an electrode of said tube.

References Cited in the file of this patent

UNITED STATES PATENTS

| Number | Name | Date |
|---|---|---|
| 1,539,402 | Nichols | May 26, 1925 |
| 2,193,850 | Andrieu et al. | Mar. 19, 1940 |
| 2,196,825 | Giger | Apr. 9, 1940 |
| 2,212,202 | Faudell et al. | Aug. 20, 1940 |
| 2,254,087 | Percival | Aug. 26, 1941 |
| 2,411,573 | Holst et al. | Nov. 26, 1946 |

FOREIGN PATENTS

| Number | Country | Date |
|---|---|---|
| 40,069 | Netherlands | Feb. 15, 1937 |
| 597,652 | Great Britain | Apr. 24, 1945 |